Figure 1:
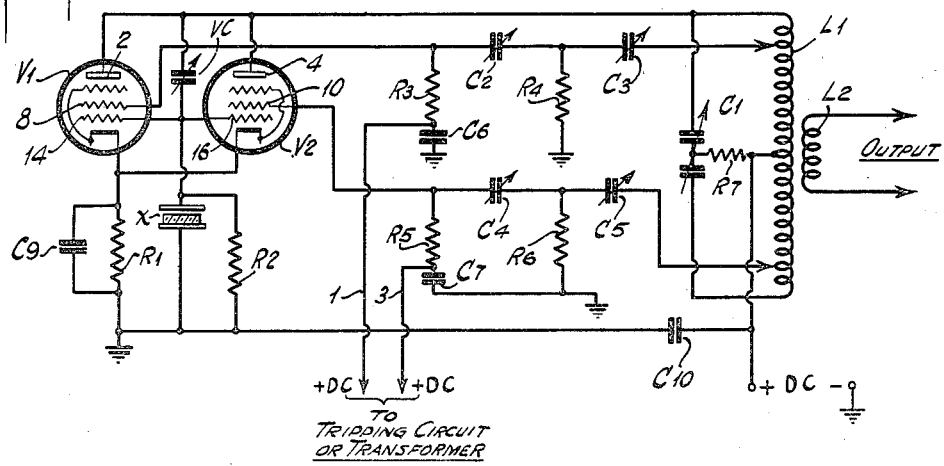

May 25, 1948.  G. L. USSELMAN  2,442,317
MODULATION
Filed July 30, 1945  4 Sheets-Sheet 1

INVENTOR
GEORGE L. USSELMAN.
BY H. S. Grover
ATTORNEY

May 25, 1948. G. L. USSELMAN 2,442,317
MODULATION
Filed July 30, 1945 4 Sheets-Sheet 2

INVENTOR
GEORGE L. USSELMAN.
BY H.S. Grover
ATTORNEY

May 25, 1948.　　　G. L. USSELMAN　　　2,442,317
MODULATION
Filed July 30, 1945　　　4 Sheets-Sheet 3

Fig. 4.

INVENTOR
GEORGE L. USSELMAN.
BY H. S. Grover
ATTORNEY

Patented May 25, 1948

2,442,317

UNITED STATES PATENT OFFICE 2,442,317

MODULATION

George L. Usselman, Port Jefferson, N. Y., assignor to Radio Corporation of America, a corporation of Delaware Application July 30, 1945, Serial No. 607,883

16 Claims. (Cl. 179—171.5)

1

The present application relates to apparatus for generating oscillatory energy and modulating the phase or frequency of the generated energy in accordance with signals. In the description reference will be made mainly to telegraphy and like signals but it will be understood that signals of other types such as voice or music may be used.

The object of my invention is improved generation and improved frequency modulation of oscillatory energy.

Means for generating oscillatory energy and modulating the frequency of the same are known in the prior art but as known are often complicated in nature and not too satisfactory in operation. A more detailed object of my invention is to provide a simple oscillation generator and frequency modulator. This is accomplished by making use of a pair of tubes in an improved oscillation generating circuit which circuit is so arranged that the frequency of the generated oscillations may be varied by signals readily. The arrangement then may be said to be a combined modulator and oscillator.

In modulators of this type the frequency of the generated oscillations is swung in accordance with the signals and occupies a prescribed frequency spectrum in which it must be maintained. This requires that the mean frequency about which the oscillations are swung be stabilized. A further object of my invention is to provide a combined oscillator and frequency modulator including means whereby the mean frequency of operation is stabilized or fixed, and yet the arrangement is such that the frequency of the oscillations generated can be readily modulated in accordance with signals the required amount.

In many simplified modulation systems when the frequency or phase of the oscillatory energy is modulated undesired amplitude modulation in accordance with signals and power supply variations is encountered. An object of my invention is to so arrange or balance my simplified modulation circuits that the undesired amplitude modulation is bucked out or substantially eliminated so that the amount of limiting needed in the modulator output is lessened. This is accomplished in accordance with my invention by using a pair of tubes in an oscillation generating circuit and by modulating the tubes differentially so that in so far as the modulation potentials and power supply voltages are concerned the system is balanced.

In my system a pair of electron discharge devices have their anodes associated with a tank circuit and have regeneratively coupled control grids, and also have other grids coupled by phase shifting networks to the tank circuit so that a phase quadrature relation is established between the radio frequency potential on the control grids and the other grids of each tube, the phase quadrature being advanced in one tube and being retarded, that is, in reverse direction in the other tube so that the output of each tube is of different phase. One tube has its phase ahead of the carrier and the other tube has its phase behind the carrier wave. When the tubes are excited symmetrically to have equal gains, they operate at a fixed frequency which may be stabilized by a tuned circuit or a crystal oscillator ground to the proper dimensions for the desired mean fixed frequency. Differential modulation of the tubes changes the gain of the tubes and permits the frequency of operation thereof to swing towards the frequency at which the tube having the highest gain would normally operate. A feature of my invention is the use of the networks as described above supplying the quadrature excitation voltages to one set of grids in the two tubes in addition to the regenerative feedback supplying voltages to another set of grids in regenerative sense.

Phase shifters are used to apply the phase quadrature voltages to the screen grids and in my system phase shifters composed entirely of resistances and condensers which may be considered aperiodic since they are not tuned to the operating frequency are used, so that the only tuned circuit is the tank circuit which reverses the voltages applied by the phase shifters to the grids. Phase shifters of this type are not affected by stray fields and as a consequence are more reliable in operation. The phase shift produced is substantially constant during operation when the capacitors and resistors have low temperature coefficients. The amount of phase shift produced is easily calculated and adjusted as desired.

The manner in which the above objects and others are attained will be described in detail hereinafter. In this description reference will be made to the drawings wherein Figs. 1 to 5 inclusive each illustrate a different embodiment of my improved apparatus for generating oscillatory energy and modulating the phase or frequency of the same in accordance with signals.

In Figs. 1, 2, 3, 4, and 5, the pair of electron discharge devices have their anodes coupled in parallel by the tank circuit and their screen grids coupled to the tank circuit by phase shifting networks.

In all embodiments a point on the tank circuit is coupled to the cathodes of the tubes and in Figs. 2, 3, 4 and 5 the control grids of the respective tubes are coupled to the other end of the tank circuit to operate in the oscillation generating circuits approximately 180° out of phase with respect to the radio frequency voltage on the anodes of the said respective tubes.

In the embodiment illustrated in Fig. 3 a keyed tripping circuit and an additional modulating circuit are arranged to be coupled to the tube electrodes differentially for modulation purposes. This modulating circuit may be used in like manner in the systems of Figs. 1 and 2.

Figure 1A:
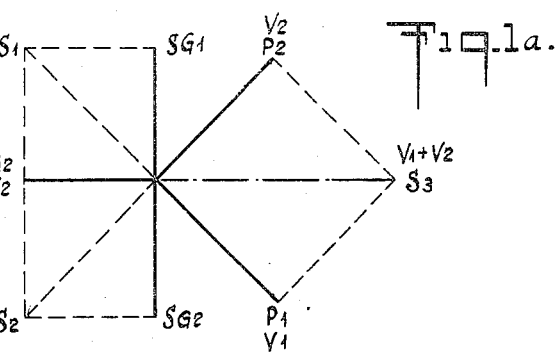

Fig. 1A is a vector diagram used to show the relation of radio frequency voltages on electrodes of tubes V1 and V2 of my system.

In Fig. 1, a pair of electron discharge tubes V1 and V2 have their anodes 2 and 4 tied together and coupled to one end of a tuned tank circuit comprising capacitor C1 and inductor L1. An output circuit in the form of an inductance L2 may be coupled to L1 although other coupling means may be used if desired. A point on the inductance L1 is coupled to the positive terminal of a source of direct current potential and to ground by a capacitor C10. This point is also connected to a point intermediate the sections of capacitor C1 by a resistance R7 that uncouples the capacitive and inductive branches of the tank circuit so that split tuning will not take place. In other words, resistor R7 prevents the upper and lower halves of the tank circuit from being resonant at different frequencies in case their constants are not similar. The use of R7 is desirable in order that all parts of the tuning condenser be kept at the same direct current potential and thereby prevents arcing or condenser breakdown. A first phase shifting network comprising series capacitors C2 and C3 and shunting resistances R3 and R4 connect a point on the anode end of the inductance L1 to the screen grid 8 of tube V1. A similar phase shifting network including capacitors C4 and C5 and resistances R5 and R6 couple a point on the other end of the inductance L1 to the screen grid 10 of tube V2. Capacitors C6 and C7 are large and are used to complete the radio frequency circuits of the phase shifting networks but are small enough to block currents of the frequency of the modulating potentials applied from any desired means, not shown in Fig. 1, such as a tripping circuit or transformer to leads 1 and 3, and thence differentially to the screen grids 8 and 10. A piezo crystal of the desired dimensions is connected between the control grids 14 and 16, which are tied together, and ground and the cathodes of the tubes. A common cathode biasing resistance R1 is shunted by a coupling and radio frequency bypassing capacitor C9. A biasing resistance R2 is connected between the control grids 14 and 16 of the tubes and ground. When the electrodes 8 and 10 are screening electrodes the modulating potentials applied to the leads 1 and 3 may be superimposed on direct current positive potentials of the desired value.

The common cathode resistance R2 maintains substantially constant bias on the control grids 14 and 16 of tubes V1 and V2 since the sum of the currents through both tubes is substantially constant if the modulating potentials are properly balanced. In my system they are balanced by proper selection of resistances R3 and R5 and condensers C6 and C7 and application of proper modulating potentials to leads 1 and 3.

A variable capacitor VC is coupled substantially directly between the anodes of the tubes V1, V2 and the control grids 14 and 16 of these tubes. The capacitor VC feeds voltage from the anodes to the control grids and when proper potentials are applied to the tube electrodes and circuit L1, C1 is tuned to the frequency of operation of the crystal generation of oscillations in the system will take place. The crystal is connected between the control grids and cathodes, the plate to grid reactances are made capacitive and here the capacities include VC in the feedback paths. Then to have oscillations take place, the plate to cathode and grid to cathode reactances are to be inductive. By tuning the tank circuit slightly above the desired frequency of operation, it becomes predominately inductive in character as does the crystal at the frequency of operation which is determined by the crystal. Then the voltages at the anodes and grids are about 180° out of phase so that the feedback is regenerative and since the tube is an amplifier, oscillations are continuously generated. Since V1 and V2 are screen grid tubes the condenser VC supplies the necessary feedback voltage.

Now assume that the tubes and circuits start generating oscillations which they will do when the proper direct current potentials are applied to the electrodes, and C1, L1 is properly tuned as described above, and C1 is adjusted for the best operating point. The anodes of the tubes are tied together so that the oscillating radio frequency voltages thereon are of a first and like phase. The screen grid 8 of tube V1 is coupled by a phase shifting network C2—C3, R3—R4, to a voltage point on L1, whereat the radio frequency voltage phase is the same as the phase of the voltage on the anodes 2 and 4. The phase of this voltage as applied to the grid 8, however, is advanced about 90° by the phase shifting network so that the screen grid 8 and control grid 14 are excited about in phase quadrature relation. The sum of the excitation on the control grid 14 and the screen grid 8 of tube V1 is lagging something less than 90°, say 45°, so that the anode current output of tube V1 is lagging say 45° in relation to the phase oscillating current in tank circuit C1—L1. The phase shifting network C4—C5, R5—R6, is coupled to a point on the inductance L1 where the phase of the voltage opposes the phase of the voltage on the anodes of the tubes, and this voltage is advanced in phase about 90° and applied to the screen grid electrode 10 so that in this tube again we have a phase quadrature relation between the voltages on the control grid 16 and screen grid 10. This last voltage is of a phase, however, which is opposite to the phase of the voltage on the screen grid 8. Again the sum of the voltages on the control grid 16 and the screen grid 10 is leading something less than 90°, say 45°, so that the anode current output of tube V2 is say 45°, is advanced this time as compared with the oscillations in the tank circuit C1—L1. The relation of the radio frequency voltages on the grids and anodes of the tubes V1 and V2 are represented by the vectors in Fig. 1A. In these vectors P1 and P2 may represent the radio frequency voltages on the anodes of tubes V1 and V2 (if they were not connected together), and SG1 and SG2 may represent the radio frequency voltages on the screen grids of tubes V1 and V2, while G1 and G2 represents the voltage on the control grids of tubes V1 and V2. The vector S1 represents the sum of the voltages on the control grid and the screen grid of tube V1 and the vector S2 represents the sum of the voltages on the control grid and the screen grid of tube V2. Vector S3 represents the sum of the currents and the voltage of the anodes of both tubes V1 and V2.

The frequency of operation of the individual tubes and of the tubes as entrained by the circuits depends on the phase relation of the radio frequency voltages on the tube electrodes and on the state of conductivity of the respective tubes. If like direct current potentials are applied to the screen grids and the phase of the electrode voltages are as shown in Fig. 1A, the system will oscillate at a frequency depending upon the dimensions of crystal X, which frequency will be slightly above the frequency at which crystal X per se oscillates since the anode tank L1—C1 is tuned slightly off the crystal frequency and oscillation by the principle described above is involved by virtue of feedback through VC from the plates to the grids.

The excitation energy from the anode end of the tuned circuit to the screen grid 8 is relatively advanced 90° by the phase shifting network. The excitation energy to the screen grid 10 of V2 is also relatively advanced by its phase shifting network but is initially 180° out of phase with respect to the anode voltage so that the excitation on the grid 10 is lagging the anode voltage by about 90°. The phase of the oscillations generated in the tank circuit C1—L1 is the resultant of the phase of the control grid excitation, by way of the capacity of condenser VC, and the excitation voltages on the screen grids 8 and 10. In other words, the tube V1 delivers power of lagging phase angle to the tank circuit because its screen grid excitation is leading. The tube V2 delivers power of leading phase angle to the tank circuit C1—L1 because its screen grid excitation is lagging. As long as the tubes V1—V2 deliver equal power as is the case when no modulation is present, then the oscillator operates at the normal crystal frequency. However, if one tube delivers more power than the other the oscillator frequency will change by "pulling" the crystal frequency one way or the other. For example, if during the modulation cycle the screen grid of tube V1 is biased more positive and the screen grid of tube V2 is less positive then since V1 delivers phase retarded power and more power than tube V2 the frequency of the oscillator will be decreased. On the other hand, if the power output of the tube V2 is increased by making its screen grid 10 more positive and the potential of screen grid 8 of tube V1 is made less positive, and since the phase of the power from tube V2 is leading the frequency of the oscillator will be increased. Modulation potential applied differentially to the screen grid electrodes by leads 1 and 3 results in frequency modulation of the oscillations generated in accordance with the modulation potentials. Amplitude variation of the modulated radio frequency by the signals or by power supply variations are corrected due to the differential action. The modulation potentials may represent telegraphy code or similar signals or music or voice. The latter may be applied by a transformer secondary winding tapped to supply the direct current potentials for the screen grids or telegraph signals may be applied by control circuits as disclosed in my U. S. application Serial #535,829, filed May 16, 1944.

The arrangement of Fig. 1 is well adapted to modulation systems wherein the frequency swing is limited to a relatively narrow band such as, for example, in frequency shift telegraphy. The crystal X common to the generating circuits acts as a band pass filter as well as performing its frequency control and oscillator drive functions. In these systems the carrier is swung from a first frequency representing say "mark" to a second frequency representing say "space," separated from the first frequency by say 200 to 2000 cycles. The no signal frequency may be between the mark and space frequencies, or may be at space frequency.

Figure 2:
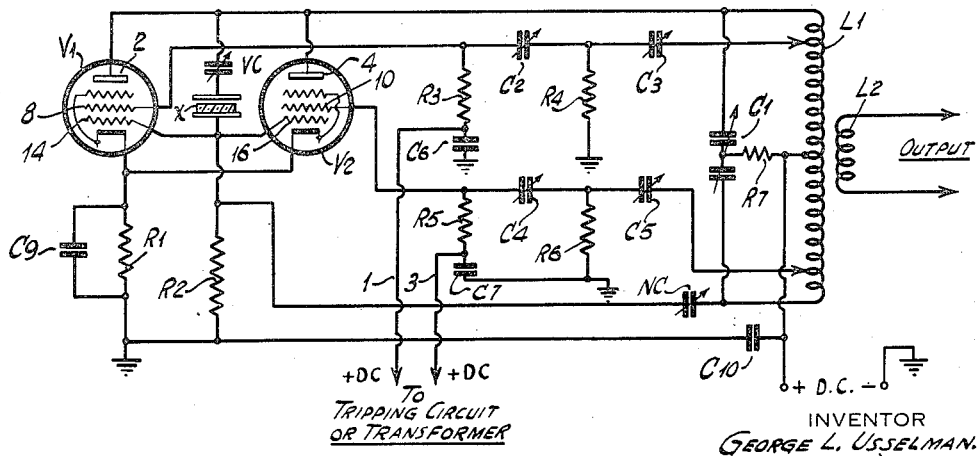
Figure 2:
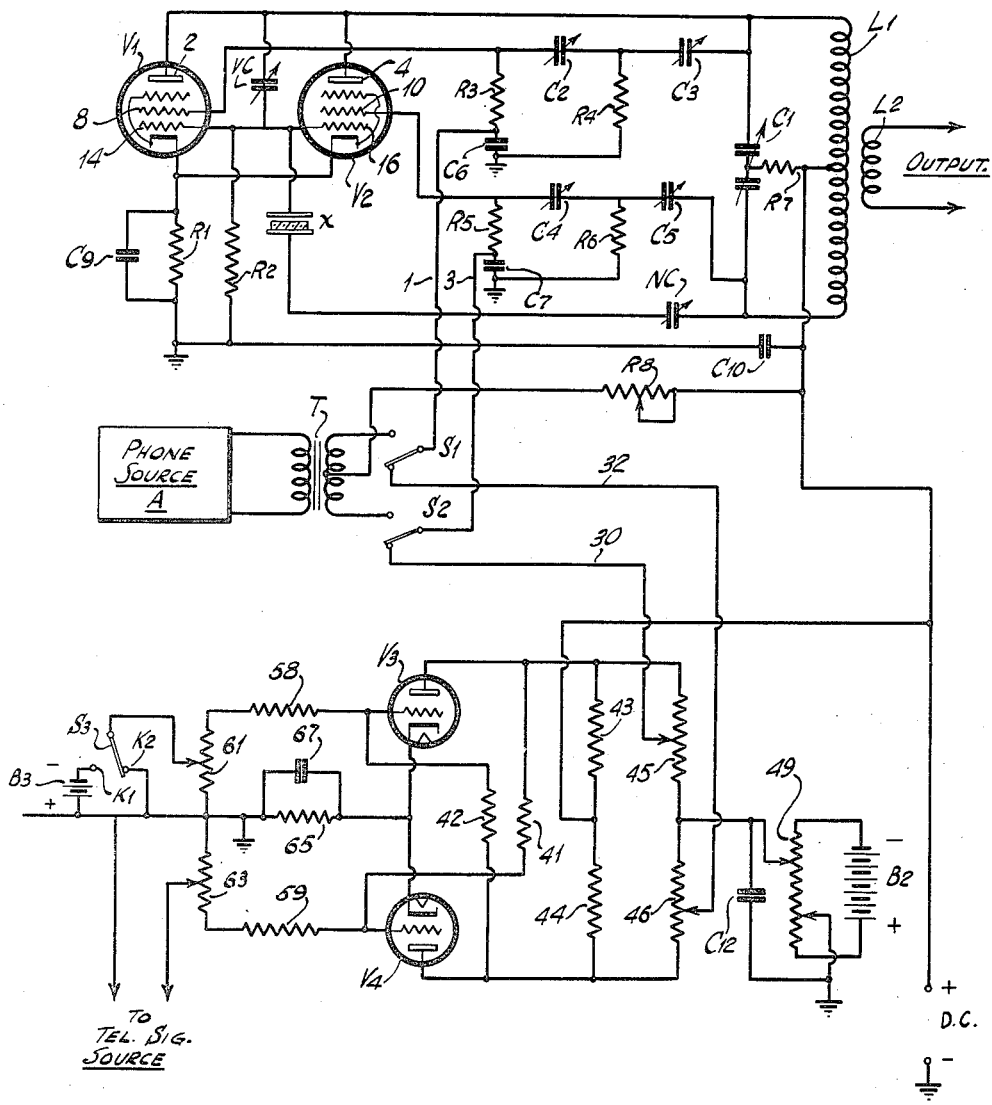

The embodiment of Fig. 2 is similar in many respects to the embodiment of Fig. 1. The embodiment of Fig. 2, however, differs from the embodiment of Fig. 1 in the following respects. The crystal X in Fig. 2 is connected in series with the condenser VC between the anodes 2 and 4 and the control grids 14 and 16. The regenerative feedback circuit and the oscillation generator in this embodiment is of the Pierce type. An additional feedback condenser NC in Fig. 2 connects the end of the tank circuit CL—L1 remote from the anodes 2 and 4 to the control grids 14 and 16. By adjusting this condenser the amount of regenerative or phase opposed feedback may be set for best operation.

The condenser VC adjusts the coupling or feedback between the grids and the anodes through the crystal, while the condenser NC is used mainly as a neutralizing condenser to neutralize this feedback capacity to prevent oscillations if the crystal does not oscillate. Of course if NC is not properly adjusted it will buck or boost the feedback depending on the adjustment.

The system of Fig. 2 operates in about the same manner in which the system of Fig. 1 operates. Oscillations are generated of a frequency controlled by the resultant of the phase of excitation of the screen grids and control grids of the respective tubes. The circuit L1—C1 is tuned substantially to the crystal frequency. Carrier frequency or no modulation frequency output is produced when the voltages on the screen grids are about equal. The frequency then shifts up if the tube having a leading phase screen grid excitation gives most output, or down if this tube has the least output.

The oscillation generator including tubes V1 and V2 and their connections in Fig. 3 are substantially similar to the embodiments illustrated in Figs. 1 and 2, but differ therefrom in these respects. In Fig. 3 the feedback condenser VC is connected as in Fig. 1 between the control grids 14 and 16 and the anodes 2 and 4. The crystal X holder capacity in this embodiment is included in series with a neutralizing or regeneration condenser NC between the end of parallel reactances L1—C1, remote from the anode, and the control grids 14 and 16. A center point intermediate the terminal of L1 is as in the prior figures grounded for radio frequency voltages by condenser C10. The remaining connections of the generating circuits of Fig. 3 are like those of Fig. 1. The crystal here acts as a narrow band pass filter and stabilizes the frequency of the oscillations generated as in the prior modifications because the system here is neutralized if the crystal does not oscillate. The crystal band pass is sufficient to pass a band of frequencies several hundred cycles wide and the systems are well adapted to frequency shift telegraphy.

In Fig. 3 I have shown somewhat completely modulating and keying means which may be used with the oscillation generators of Figs. 1, 2 and 3. Switches S1 and S2 are used to switch the modulator to the "phone" source through transformer T or to the tripping circuit tubes V3 and V4. A double pole double throw switch may be used for this purpose. The leads 1 and 3 may be connected to the movable members of the double throw, double pole switch S1, S2. A pair of the contacts of this switch may be connected by a transformer T to a source of modulating potentials such as those representing voice signals and the like. When the switch is in the other position, i. e., in the position shown, the leads 1 and 3 may be connected to the resistors 45 and 46 of a tripping keying circuit such as disclosed more in detail in my U. S. application Serial #521,907, filed February 11, 1944. This keyed tripping or switching circuit including tubes V3 and V4 supply at the leads 30 and 32 direct current potentials which are applied by way of leads 1 and 3 to the screening electrodes. The direct current potentials are made of a value such as to alternately key the tubes V1 and V2 from a conductive condition to a non-conductive condition. Preferably the potentials swing from a positive value at which the tubes are conductive to a negative value at which they are cut off.

The tripping and keying circuit comprises tubes V3 and V4 with their anodes and control grids cross-coupled by resistances 41 and 42 in such a way that the potential drops in the anode resistors 43 and 44 connected between the anodes are applied respectively to the grids of the tubes V4 and V3. When one of these tubes draws current the grid of the other thereof is made more negative by applying the potential drop at the anode of the said one tube to the grid of the other tube. In this manner current is caused to flow through tube V3 while tube V4 is cut off or vice versa.

A point intermediate the resistances 43 and 44 is connected to the positive terminal of a source of direct current potential. A point intermediate the terminals of resistances 45 and 46 is connected to a point on a potentiometer resistance 49 shunting a source of potential B2 the positive terminal of which is grounded. This source of potential is shunted by a condenser C12 of a size sufficient to bypass potentials of the keying frequency about the source B2. The resistances 45 and 46 which are potentiometers have points thereon connected to the leads 30 and 32 and thence by leads 1 and 3 to the screening electrodes of tubes V1 and V4 for modulation purposes. The outer ends of the resistances 45 and 46 are connected to an alternating varying positive voltage source, i. e., to the anodes of tubes V4 and V5 which, as described hereinafter, swing alternately positive and less positive as the control grids of the tubes or one thereof is controlled by signal potentials. The potential on the leads 30 and 32 therefore is a resultant of the potentials on the anodes of tubes V3 and V4 and of the potential from the main direct current source DC and the potential derived from source B2 by way of the potentiometer 49 and also of the conductivity of the tubes V3 and V4.

The tripping tubes V3 and V4 have their control grids coupled respectively by resistances 58 and 61, and 59 and 63, to ground, and by resistance 65 shunted by a bypass condenser 67 of low impedance to potentials of the keying frequency to the cathodes of tubes V3 and V4. 61 and 63 are potentiometer resistances with a point on resistance 61 connected by switch S3 either to the positive terminal of a source B3 or to ground. A point on potentiometer resistance 63 is connected to a source of signals, for example, keyed pulse energy, or keyed direct current or keyed alternating current energy. The other terminal of the resistance 63 is connected to ground so that the signals are applied to the control grid of tube V4 with respect to its cathode. The source B3 is sometimes necessary to apply a fixed negative bias to the grid of tube V3 in order to get positive tripping action. The arrangement is such that the tube V3 is biased to cutoff in the absence of marking and spacing signals either by the drop in potential in resistance 58 and 61 or if necessary by negative potential from the source B3 with switch S3 on contact K1 instead of on K2. The current then is switched through tube V4 and the resistances 43, 44, 45 and 46, the direct current source and the tap on potentiometer 49, etc., are such that the potential at the anode of V4 drops the required amount. This falling potential is fed to the screen grid 8 by leads 32 and 1 and is sufficient to swing the screen grid 8 negative or less positive enough to block or bias tube V1 and cut off or reduce current therethrough. At the same time the anode of tube V3 swings more positive because current through tube V3 is cut off or reduced, and its anode is at or near the direct current source potential. The elements are dimensioned and adjusted to values such that the screen grid for tube V2 is made positive by this positive potential supplied by leads 30 and 3, and tube V2 draws current so that oscillations of a leading phase are supplied by tube V2 to the tank circuit and the frequency of operation of the system goes up and oscillations of one frequency are transmitted. They might well represent "no signal" or "space" signal.

Now when keying signals are applied an alternating current or direct current potential fed at the input and applied to the grid of tube V4 switches the current through tube V3 by blocking or biasing tube V4 and by virtue of the cross-couplings 42 and 41. With the current switched through tube V3 and cut off in tube V4 a more negative potential is fed by leads 30 and 3 to the screen grid 10 and a more positive potential is applied from the anode of tube V4 by leads 32 and 1 to the screen grid 8 of tube V1 and this tube V1 becomes conductive to supply oscillations in the tank circuit L1—C1 of lagging phase so that the frequency of the oscillations becomes lower and oscillations of this frequency may represent the marking condition.

Alternating current or direct current may be used for keying purposes. If alternating current pulses are applied to the control grid of tube V4, through which the current is switched in the absence of signals, the positive excursions of the alternating current have no effect because the tube V4 is already drawing maximum current. The negative cycles of the keyed alternating current however, make the grid of tube V4 negative to cut off current therein and switch the same through tube V3 as described hereinbefore. Adjustment of the point on potentiometer 61 permits operation such that the positive bias on the tube V4 is overcome by the applied signals to insure the current switching action. If necessary more negative potential may be applied to the grid of V3 from the source B3 by putting the switch S3 on contact K1.

I have found that when telephony signals or tone modulation is applied to the screen grids of a modulator, distortion in the modulated output may result. In Fig. 4 I show a circuit arrangement by which the signal modulation may be applied to the control grids of the modulator tubes as well as to the screen grids. In this embodiment phone signals or tone signals may be applied to the control grids and telegraphy or similar signals may be applied to the screen grids as in the prior embodiment. Application of the telephony or tone modulation to the control grids produces substantially undistorted voice or sine wave modulation of the output in accordance with the signals.

Inspection of the arrangement of Fig. 4 will show that as far as the oscillation generator circuit is concerned, this embodiment is a modification of the embodiment of Fig. 2. Furthermore, it will be seen that the modulation circuits of Fig. 4 may also be used with the embodiments of either Fig. 1 or Fig. 3. In Fig. 4 as stated above the oscillation generating circuits and phase shifting networks and crystal X are arranged substantially as in Fig. 2. In Fig. 4, however, the switches S1—S2 are arranged to be connected to the tripping circuit, by leads 32 and 30, or to the movable tap on a potentiometer resistor 28 in shunt to the main direct current source. The grid leak resistor R2 and a second grid leak resistor R3 are now connected to the secondary winding of the audio transformer T. A point on this transformer T secondary winding is connected to the movable tap on a potentiometer resistance 24 shunting a source of direct current potential B4 the positive terminal of which is grounded as is the cathodes of the tubes V1 and V2. The lower ends of resistances R2 and R3 are also connected to ground and the cathodes of V1 and V2 by radio frequency bypassing condensers 20 and 22. The primary winding of transformer T is connected through a switch S4 to a source of telephony signals or tone signals. The control grids are coupled together by condensers 25 and 27 and the point between these condensers is coupled to the end of the tank circuit C1—L1 remote from the anodes end by a neutralizing condenser NC the purpose of which is as described hereinbefore in connection with Fig. 2. These condensers 25 and 27 pass the radio frequency oscillations but block direct current and voltages of modulation frequency and permit application of the modulating potentials from transformer T differentially to the control grids 14 and 16. The cathodes of tubes V1 and V2 are connected directly to ground. The connections are otherwise substantially as in Fig. 2.

With the switches S1 and S2 in the position shown, an adjustable steady direct current potential of proper value is applied from the direct current source to the screen grids 8 and 10 and the system oscillates as described hereinbefore at a frequency intermediate the two limiting frequencies at which it operates during modulation. This is assuming that the system is balanced and no modulation is applied to the control grids or the screen grids. Both tubes supply radio frequency energy, one of a leading phase the other of a lagging phase, and as a result oscillation takes place at a phase intermediate said leading and lagging phase.

When it is desired to send telegraphy signals the switches S2—S1 are moved down to the contacts connected to the leads 32 and 30 and the switch S4 is opened so that differential modulation of the potentials on the screen grids 8 and 10 in accordance with keyed alternating current or direct current takes place, as described in connection with Fig. 3, through operation of the tripping circuit including tubes V3 and V4. Any other convenient means may be used for differentially applying the keying potentials and the necessary steady direct current potential through the leads 32 and 30 to the screen grids 8 and 10.

When it is desired to use phone modulation instead of telegraphy the switches S1 and S2 are put in the position shown and switch S4 is closed. Now steady direct current potential only is applied to the screen grids 8 and 10 and the modulation is applied differentially to the control grids 14 and 16. After proper operating potentials have been applied the bias adjustments 24 and 28 are set for best operation. As the modulating potentials are applied the gains of the tubes V1 and V2 are differentially modulated so that one or the other thereof supplies the more current, say current of leading phase, while the remaining tube supplies the lesser current, say current of lagging phase and vice versa, so that the frequency of the generated oscillations varies in accordance with the amplitude of the phone signal.

Most any type of crystals and crystal holders may be used in these circuits but I have found that the pressure type of crystal holders respond best to modulation. However, the pressure type crystals possibly do not hold the frequency so accurately as the free type crystal holders and moreover the pressure type crystals probably deteriorate faster.

Figure 5:
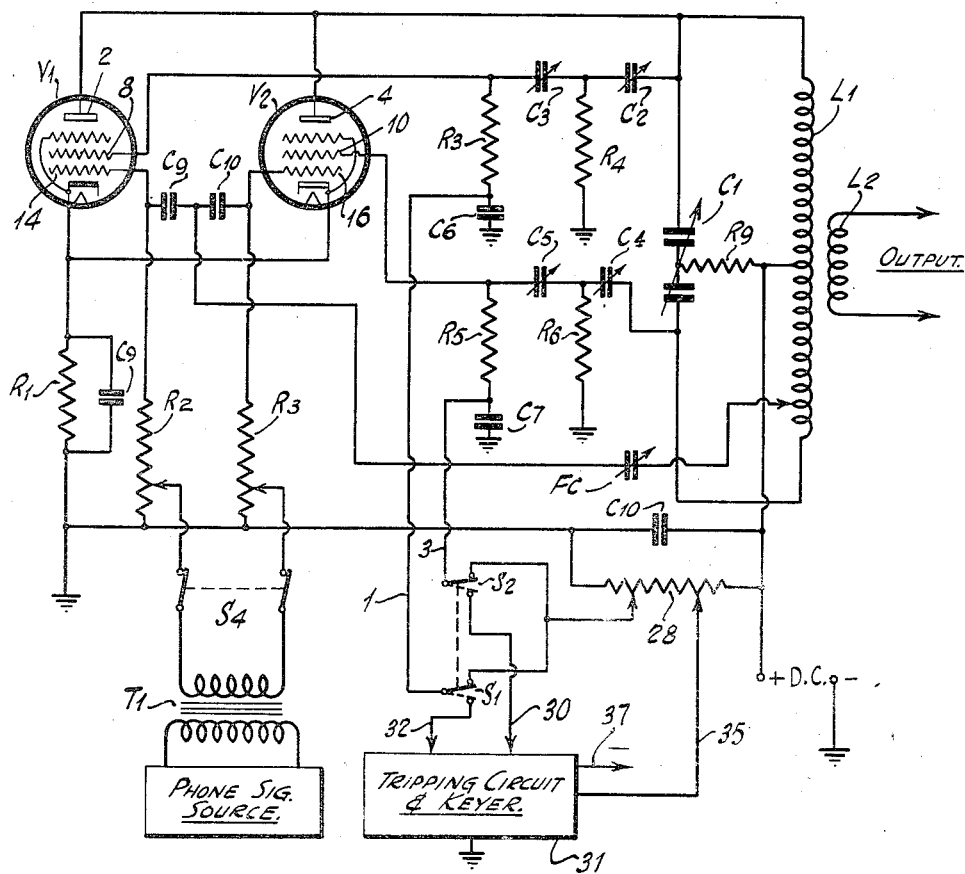

The arrangement of Fig. 5 with respect to the radio frequency circuits is similar to the corresponding circuits in Fig. 4, except that in Fig. 5 the piezo electric crystal between the anode and control grid is omitted. In the embodiment of Fig. 5 a common cathode resistor R1 is connected between the cathodes of the tubes V1 and V2 and ground, as in Figs. 1, 2 and 3. The biasing resistors R2 and R3 now take the form of potentiometer resistances connected between the grids 14 and 16 and ground with the taps thereon connected by the switch S4 to the secondary winding of the transformer T1. The taps on R2 and R3 are set so that the lower ends of R2 and R3 matches the transformer impedance. This changes the bias circuit to some extent since in Fig. 5 the secondary winding of the transformer is not tapped (as in Fig. 4) and the potentiometer resistance 24 and source B4 of Fig. 4 are omitted. The potentiometer resistor 28 now has two taps thereon, one of which is connected to the screen grids by switches S1 and S2 in the position shown. The tripping circuit and keyer is diagrammatically shown in Fig. 5 by rectangle 31. The direct current source used for the oscillation generator may be used for the keying circuit and then a point between the resistors 43 and 44, Fig. 3, may be connected by lead 35 to the second tap on the potentiometer 28. A lead 37 is furnished with a negative potential by means such as the potentiometer 49 of Fig. 3 and supplies the desired negative potential to the junction point of the potentiometers 45 and 46 of the tripping circuit.

The system oscillates for reasons described hereinbefore by virtue of feedback through feedback condenser FC, but in this embodiment the tank circuit C1—L1 now becomes the frequency controlling circuit because the stabilizing crystal X is omitted. Oscillation takes place however, as in the embodiment of Fig. 2.

With the switches S1, S2 and S4 in the position shown, phone signals are applied to the transformer T1 and thence to the control grids for phone modulation of the oscillation's generator. With the switches S1 and S2 closed in the lower position, and switch S4 open, telegraphy signals represented by alternating current or direct current pulses may be applied to the tripping circuit and keyer to modulate the oscillations generated in accordance therewith.

It will be noted that in each embodiment I provide an oscillation generator, since in each embodiment there is a tube or a pair of tubes with an anode, a cathode and a control grid regeneratively coupled in an oscillation generating circuit. The frequency of the oscillations generated is determined by the crystal or by the crystal and the tuned circuit or by the tuned circuit, and oscillations of strong constant amplitude are developed. In addition I provide improved means for controlling the amount of feedback in the form of the condensers VC and NC in several of the embodiments. This condenser permits adjustment of the amount of feedback and as a consequence adjustment of the strength of the oscillations developed. These circuits are in addition to the phase shifting networks R3—C2, R4—C3, R5—C4, and R6—C5, which apply the quadrature voltages to the screen electrodes. The frequency of the operation depends upon the resultant phases of the voltages on the screen electrodes and control electrodes and the tube electrode potentials. Obviously, the frequency of operation may be readily shifted by changing the phase of one or more of the said voltages. Thus is provided an oscillation generator which not only may be modulated but which may be put to other purposes where a good oscillation generator the frequency of which may be changed through a limited range readily by changing the biasing or charging potential on an electrode of one tube or both tubes, and/or by changing the phase of feedback of the voltages to the screen grids. For example, the frequency of the oscillations generated may be changed by merely changing the fixed direct current potential on the screen grid of one or both tubes. When the potential on both tubes is changed the change should be differential. The frequency may also be changed by changing the constants of one or both of the phase shifting networks. The oscillator will operate as described hereinbefore with one tube removed or with a simplified circuit using only one tube.

By use of the auxiliary grids it will be noted that modulation may be applied to the control grids or to the screen grids or to both. Double modulation may be desired in some cases. For example, if frequency shift telegraphy signals are being sent by keying differentially the potentials on the screen grids I may supply tone for identification purposes to the control grids. Then an arrangement such as shown in Figs. 4 and 5 could be used and the switches S4 would be closed when the switches S1 and S2 are in the lower position connecting the screen grids to the tripping circuit.

What is claimed is:

1. In apparatus for generating oscillatory energy, an electron tube having an anode, a cathode, a control grid and an auxiliary electrode, a circuit tuned substantially to the desired operating frequency, couplings between the anode, cathode and control grid of said tube and the tuned circuit such that when oscillatory energy of the desired operating frequency is developed in said tube and tuned circuit the phases of the voltages of the generated frequency on the anode and control grid of the tube are substantially opposed, and additional connections between said tuned circuit and said auxiliary electrode such that when oscillatory energy of the desired operating frequency is developed in said tube and tuned circuit the phases of the voltages of the generated frequency on the control grid and auxiliary electrode of the tube are displaced by substantially 90°, the arrangement being such that when proper operating potentials are applied to the electrodes of said tube oscillator energy of a frequency determined in part by the relative phases of the generated voltages on the grids and auxiliary electrode of said tube is generated.

2. In apparatus for generating oscillatory energy, two electron tubes each having an anode, a cathode, a control grid and an auxiliary electrode, a circuit tuned substantially to the desired operating frequency, couplings between the anode, cathode and control grid of each tube and the tuned circuit such that when oscillatory energy of the desired operating frequency is developed in said tubes and tuned circuit the phases of the voltages of the generated frequency on the anode and control grid of each tube are substantially opposed and regeneration takes place, and additional connections between said tuned circuit and said auxiliary electrodes such that when oscillatory energy of the desired operating frequency is developed in said tubes and tuned circuit the phases of the voltages of the generated frequency on the control grid and auxiliary electrode of each tube are displaced by substantially 90°, the arrangement being such that when proper operating potentials are applied to the electrodes of said tubes oscillator energy of a frequency determined in part by the relative phases of the generated voltages on the grids and auxiliary electrodes of said tubes, is generated.

3. In apparatus for generating oscillatory energy, two electron tubes each having an anode, a cathode, a control grid and an auxiliary electrode, a tank circuit parallel tuned substantially to the desired operating frequency, regenerative couplings between the anode, cathode and control grid of each tube and the tank circuit such that when oscillatory energy of the desired operating frequency is developed in said tubes and tank circuit the phases of the voltages of the generated frequency on the anode and control grid of each tube are substantially opposed, a piezo electric crystal common to the couplings to the control grids of the tubes, and additional connections between said tank circuit and said auxiliary electrodes such that when oscillatory energy of the desired operating frequency is developed in said tubes and tank circuit the phases of the voltages of the generated frequency on the control grid and auxiliary electrode of each tube are displaced by substantially 90°, the arrangement being such that when proper operating potentials are applied to the electrodes of said tubes oscillator energy of a frequency determined in part by the relative phases of the generated voltages on the grids and auxiliary electrodes of said tubes, is generated.

4. In a signalling system, a regenerative generator including two tubes each having an anode, a cathode, a control grid and another electrode, a tuned circuit, couplings between the tuned circuit and the anode, cathode, and control grid of each tube such that regeneration takes place in said tube and circuit when the tube's electrodes are supplied with operating potentials and oscillations are generated, other couplings between said tuned circuit and the said other electrode of each tube such that the phases of the generated voltages on the control grid and said other grid-like electrode of each tube are about in quadrature, and means for applying modulation potentials differentially to corresponding electrodes of said tubes.

5. In a signalling system, a regenerative generator including two tubes each having an anode, a cathode, a control grid and another electrode, a tuned circuit, couplings between the tuned circuit and the anode, cathode, and control grid of each tube such that regeneration takes place in said tubes and circuit when the tube's electrodes are supplied with operating potentials and oscillations are generated, other couplings between said tuned circuit and the said other electrodes of the tubes such that the phases of the generated voltages on the control grid and said other electrode of each tube are about in quadrature, and means for applying modulation potentials differentially to the control grids of said tubes, or to the said other electrodes of said tubes, or to the control grids and said other electrodes.

6. A regenerative generator including a tube having an anode, a cathode, a control grid and another grid-like electrode, a tuned circuit, couplings between the tuned circuit and the anode, cathode, and control grid of the tube such that regeneration takes place in said tube and circuit when the tube's electrodes are supplied with operating potentials and oscillations are generated, and another coupling between said tuned circuit and the other grid-like electrode of the tube such that the phases of the generated voltages on the control grid and said other grid-like electrode are about in quadrature.

7. In a signalling system, a regenerative generator including two tubes each having an anode, a cathode, a control grid and another grid-like electrode, a tuned circuit including capacity and inductance in parallel, a coupling between one end of said parallel tuned circuit and the anodes of said tubes, a feedback circuit coupling said tuned circuit to the control grids of said tubes, the arrangement being such that when said parallel circuit is tuned substantially to the desired frequency of operation, and the tube's electrodes are energized oscillations are generated by said tubes and connections of about the frequency to which said circuit is tuned, paths connecting the parallel tuned circuit to each of the other grid-like electrodes in each tube for applying the said electrodes phase opposed voltages of the generated frequency which are substantially in phase quadrature with respect to the generated voltage on the control grid of each tube, and a keying circuit coupled differentially to said other grid-like electrodes.

8. An oscillation generator, including two tubes each having an anode, a cathode, a control grid and another grid-like electrode, a tuned circuit including capacity and inductance in parallel, a coupling between one end of said parallel tuned circuit and the anodes of said tubes, feedback paths having a common portion, coupling said control grids to said tuned circuit to set up on the control grids of said tubes, when oscillations are generated in said tank circuits, voltages of the generated frequency about opposed in phase with respect to the phase of the generated voltages set up on the anodes of said tubes, and a separate phase shifting network connecting the parallel tuned circuit to the other grid-like electrode in each tube for applying to the said other grid-like electrodes phase opposed voltages of the generated frequency which are substantially in phase quadrature with respect to the generated voltage on the control grid of each tube, the arrangement being such that when the tube's electrodes are energized oscillations are generated by said tubes and connections of a frequency determined in part by the resultant of the phases of the voltages on said control grids and other grids and in part by the tuning of said parallel circuit.

9. An oscillation generator, including two tubes each having an anode, a cathode, a control grid and another grid-like electrode, a tuned circuit including capacity and inductance in parallel, a coupling between one end of said parallel tuned circuit and the anodes of said tubes, feedback paths having a common portion, coupling said control grids to the other end of said tuned circuit to set up on the control grids of said tubes, when oscillations are generated in said tank circuits, voltages of the generated frequency about opposed in phase with respect to the phase of the generated voltages set up on the anodes of said tubes, a piezo electric crystal in said common portion of said feedback paths, and a separate phase shifting network connecting the parallel tuned circuit to the other grid-like electrode in each tube for applying to the said other grid-like electrodes phase opposed voltages of the generated frequency which are substantially in phase quadrature with respect to the generated voltage on the grid of each tube, the arrangement being such that when the tube's electrodes are energized oscillations are generated by said tubes and connections of a frequency determined in part by the resultant of the phases of the voltages on said control grids and other grids and in part by the tuning of said parallel circuit.

10. An oscillation generator, including two tubes each having an anode, a cathode, a control grid and another grid-like electrode, a tuned circuit including capacity and inductance in parallel, a coupling between one end of said parallel tuned circuit and the anodes of said tubes, feedback paths, having a common portion, coupling said control grids to the other end of said tuned circuit to set up on the control grids of said tubes, when oscillations are generated in said tank circuits, voltages of the generated frequency about opposed in phase with respect to the phase of the generated voltages set up on the anodes of said tubes, a piezo electric crystal connected between the anodes and control grids of the tubes, and a separate phase shifting network connecting the parallel tuned circuit to the other grid-like electrode in each tube for applying to the said other grid-like electrodes phase opposed voltages of the generated frequency which are substantially in phase quadrature with respect to the generated voltage on the control grid of each tube, the arrangement being such that when the tube's electrodes are energized oscillations are generated by said tubes and connections of a frequency determined in part by the resultant of the phases of the voltages on said control grids and other grids and in part by the tuning of said parallel circuit.

11. An oscillation generator, including two tubes each having an anode, a cathode, a control grid and another grid-like electrode, a tuned circuit including capacity and inductance in parallel, a coupling between one end of said parallel tuned circuit and the anodes of said tubes, feedback paths having a common portion, coupling said control grids to the other end of said tuned circuit to set up on the control grids of said tubes, when oscillations are generated in said tank circuit, voltages of the generated frequency about opposed in phase with respect to the phase of the generated voltages set up on the anodes of said tubes, and a separate phase shifting network connecting the parallel tuned circuit to the other grid-like electrode in each tube for applying to the said other grid-like electrodes phase opposed voltages of the generated frequency which are substantially in phase quadrature with respect to the generated voltage on the control grid of each tube, the arrangement being such that when the tube's electrodes are energized oscillations are generated by said tubes and connections of a frequency determined in part by the resultant of the phases of the voltages on said control grids and other grids and in part by the tuning of said parallel circuit.

12. In a signalling system, a regenerative generator including two tubes each having an anode, a cathode, a control grid and another grid-like electrode, a tuned circuit including capacity and inductance in parallel, a coupling between one end of said parallel tuned circuit and the anodes of said tubes, a feedback circuit coupling said tuned circuit to the control grids of said tubes, the arrangement being such that when said parallel circuit is tuned substantially to the desired frequency of operation and the tube's electrodes are energized, oscillations are generated by said tubes and connections at said desired frequency, a separate phase shifting network connecting the parallel tuned circuit to the other grid-like electrode in each tube for applying to the said electrodes phase opposed voltages of the generated frequency which are substantially in phase quadrature with respect to the generated voltage on the control grid of each tube, and means for applying modulation potentials differentially to corresponding electrodes of said tubes.

13. In a signalling system, a regenerative generator including two tubes each having an anode, a cathode, a control grid and another grid-like electrode, a tuned circuit including capacity and inductance in parallel, a coupling between one end of said parallel tuned circuit and the anodes of said tubes, a feedback circuit coupling the other end of said tuned circuit to the control grids of said tubes, the arrangement being such that when said parallel circuit is tuned substantially to the desired frequency of operation and the tube's electrodes are energized oscillations are generated by said tubes and connections, a separate phase shifting network connecting the parallel tuned circuit to the other grid-like electrode in each tube for applying to the said other grid-like electrodes phase opposed voltages of the generated frequency which are substantially in phase quadrature with respect to the generated voltage on the control grid of each tube, and means for applying modulation potentials differentially to said other grid-like electrodes.

14. In a signalling system, a regenerative generator including two tubes each having an anode, a cathode, a control grid and another grid-like electrode, a tuned circuit including capacity and inductance in parallel, a coupling between one end of said parallel tuned circuit and the anodes of said tubes, a piezo electric crystal common to connections between the other end of said tuned circuit and the control grid of each tube, a feedback circuit coupling the anodes of said tubes to the control grids of said tubes, the arrangement being such that when said parallel circuit is tuned substantially to the frequency of operation of said crystal and the tube's electrodes are energized, oscillations are generated by said tubes and connections of a frequency determined by said crystal, a separate phase shifting network connecting the parallel tuned circuit to the other grid-like electrode in each tube for applying to the said other grid-like electrodes phase opposed voltages of the generated frequency which are substantially in phase quadrature with respect to the generated voltage on the anode of each tube, and means for applying modulation potentials differentially to said other grid-like electrodes.

15. In a signalling system, a regenerative generator including two tubes each having an anode, a cathode, a control grid and another grid-like electrode, a tuned circuit including capacity and inductance in parallel, a coupling between one end of said parallel tuned circuit and the anodes of said tubes, a piezo electric crystal common to connections between the control grid and anode of each tube, a feedback circuit coupling said tuned circuit to the control grids of said tubes, the arrangement being such that when said parallel circuit is tuned substantially to the frequency of operation of said crystal and the tube's electrodes are energized oscillations are generated by said tubes and connections of a frequency determined by said crystal, a separate phase shifting network connecting the parallel tuned circuit to the other grid-like electrode in each tube for applying to the said other grid-like electrodes phase opposed voltages of the generated frequency which are substantially in phase quadrature with respect to the generated voltage on the control grid of each tube, and means for applying modulation potentials differentially to said other grid-like electrodes.

16. In a signalling system, a regenerative generator including two tubes each having an anode, a cathode, a control grid and another grid-like electrode, a tuned circuit including capacity and inductance in parallel, a coupling between one end of said parallel tuned circuit and the anodes of said tubes, a piezo electric crystal common to connections between the control grid and cathode of each tube, a feedback circuit coupling the anodes of the tubes to the control grids of said tubes, the arrangement being such that when said parallel circuit is tuned substantially to the frequency of operation of said crystal and the tube's electrodes are energized, oscillations are generated by said tubes and connections of a frequency determined by said crystal, a separate phase shifting network connecting the parallel tuned circuit to the other grid-like electrode in each tube for applying to the said other grid-like electrodes phase opposed voltages of the generated frequency which are substantially in phase quadrature with respect to the generated voltage on the control grid of each tube, and means for applying modulation potentials differentially to said other grid-like electrodes.

GEORGE L. USSELMAN.